United States Patent [19]
Yada

[11] Patent Number: 5,481,568
[45] Date of Patent: Jan. 2, 1996

[54] DATA DETECTING APPARATUS USING AN OVER SAMPLING AND AN INTERPOLATION MEANS

[75] Inventor: Hiroaki Yada, Kanagawa, Japan

[73] Assignee: Sony Corporation, Tokyo, Japan

[21] Appl. No.: 361,451

[22] Filed: Dec. 21, 1994

Related U.S. Application Data

[63] Continuation of Ser. No. 16,968, Feb. 12, 1993, abandoned.

[30] Foreign Application Priority Data

Feb. 14, 1992 [JP] Japan ..................... 4-059709

[51] Int. Cl.$^6$ ..................... H03D 1/00
[52] U.S. Cl. ..................... 375/340; 364/724.1
[58] Field of Search ..................... 375/257, 340; 364/724.1

[56] References Cited

U.S. PATENT DOCUMENTS

| | | | |
|---|---|---|---|
| 3,851,252 | 11/1974 | Karnaugh et al. | 375/24 |
| 4,794,341 | 12/1988 | Barton et al. | 375/94 |
| 4,805,191 | 2/1989 | Burch et al. | 375/106 |
| 4,856,030 | 8/1989 | Batzer et al. | 375/106 |
| 4,977,580 | 12/1990 | McNicol | 375/97 |
| 5,061,925 | 10/1991 | Sooch et al. | 375/26 |
| 5,067,138 | 11/1991 | Van Rens et al. | 375/327 |
| 5,073,904 | 12/1991 | Nakamura et al. | 375/94 |
| 5,126,737 | 6/1992 | Torii | 375/122 |
| 5,159,338 | 10/1992 | Takahashi | 341/61 |

OTHER PUBLICATIONS

F. Dolivo, "Signal Processing for High-Density Digital Magnetic Recording", IBM Research Division, Zurich Research Laboratory, 8803 Ruschikon, Switzerland, CH2704-5/89/0000/1091/$01.00 1989 IEEE pp. 1-91, 1-95.

Primary Examiner—Stephen Chin
Assistant Examiner—Timothy J. May

[57] ABSTRACT

A data detecting apparatus for detecting desired data from a digital signal comprising a first sampling circuit for sampling the digital signal to output samples, an interpolating circuit for interpolating signal values between the samples outputted from the first sampling circuit, and a second sampling circuit for extracting those signal values interpolated by the interpolating circuit which match a phase of a point at which the desired data exists. This constitution allows to implement all blocks making up the data detecting apparatus with digital signal processing circuits synchronously operating on the a clock, detecting the reproduced signal data without being affected by jitters contained in reproduced signals coming from a channel. The constitution also makes it possible to form on a single LSI chip such circuits including the data detecting apparatus, an ECC decoder, a controller, and an interface circuit as conventionally formed on discrete chips. This permits a compact implementation of an entire apparatus and reduces its production cost. Further, this constitution facilitates the design and test for implementing the embodiment on large scale integrations and eliminates the necessity for externally attached analog parts, making the implementation free of adjustment and less susceptible to aging.

6 Claims, 14 Drawing Sheets

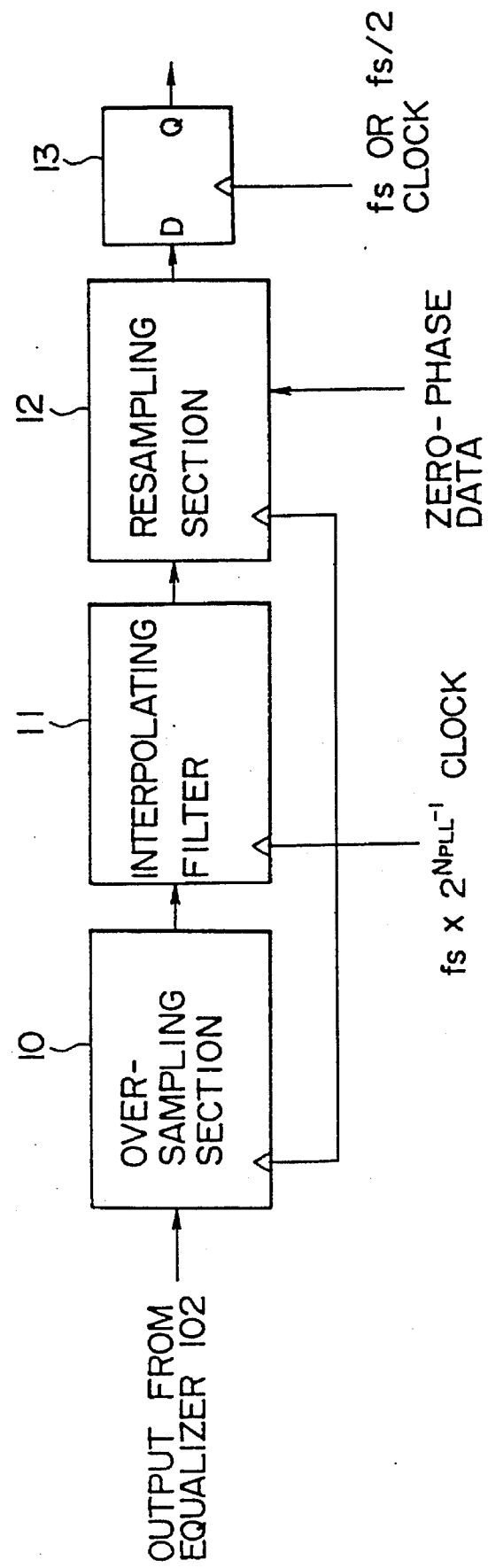

FIG. 2(a) INPUT SIGNAL TO OVER-SAMPLING SECTION 10
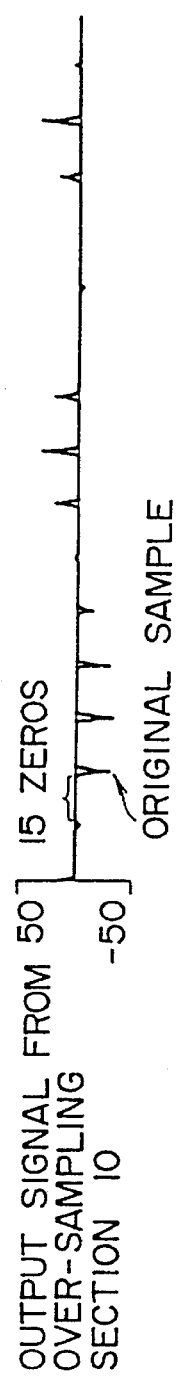
FIG. 2(b) OUTPUT SIGNAL FROM OVER-SAMPLING SECTION 10
15 ZEROS
ORIGINAL SAMPLE
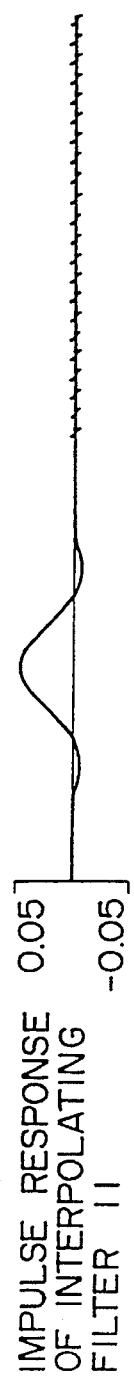
FIG. 2(c) IMPULSE RESPONSE OF INTERPOLATING FILTER 11
FIG. 2(d) OUTPUT SIGNAL FROM INTERPOLATING FILTER 11

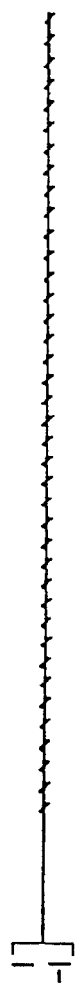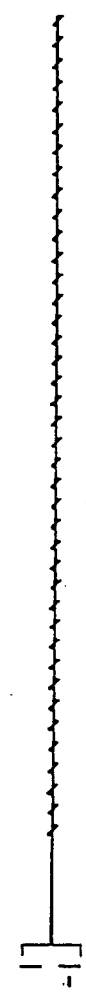
FIG. 8(a) FILTER'S THEORETICAL IMPULSE RESPONSE
FIG. 8(b) OUTPUT COEFFICIENT OF ROM 51
FIG. 8(c) OUTPUT COEFFICIENT OF ROM 52
FIG. 8(d) OUTPUT COEFFICIENT OF ROM 53
FIG. 8(e) OUTPUT COEFFICIENT OF ROM 54
FIG. 8(f) OUTPUT COEFFICIENT OF ROM 55
FIG. 8(g) OUTPUT COEFFICIENT OF ROM 56
FIG. 8(h) OUTPUT COEFFICIENT OF ROM 57
FIG. 8(i) OUTPUT COEFFICIENT OF ROM 58

F I G. 14
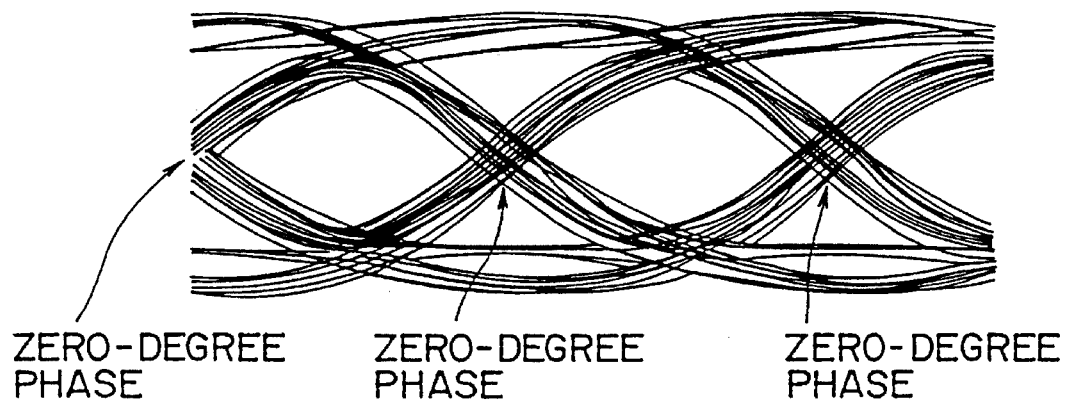
ZERO-DEGREE PHASE   ZERO-DEGREE PHASE   ZERO-DEGREE PHASE
F I G. 15
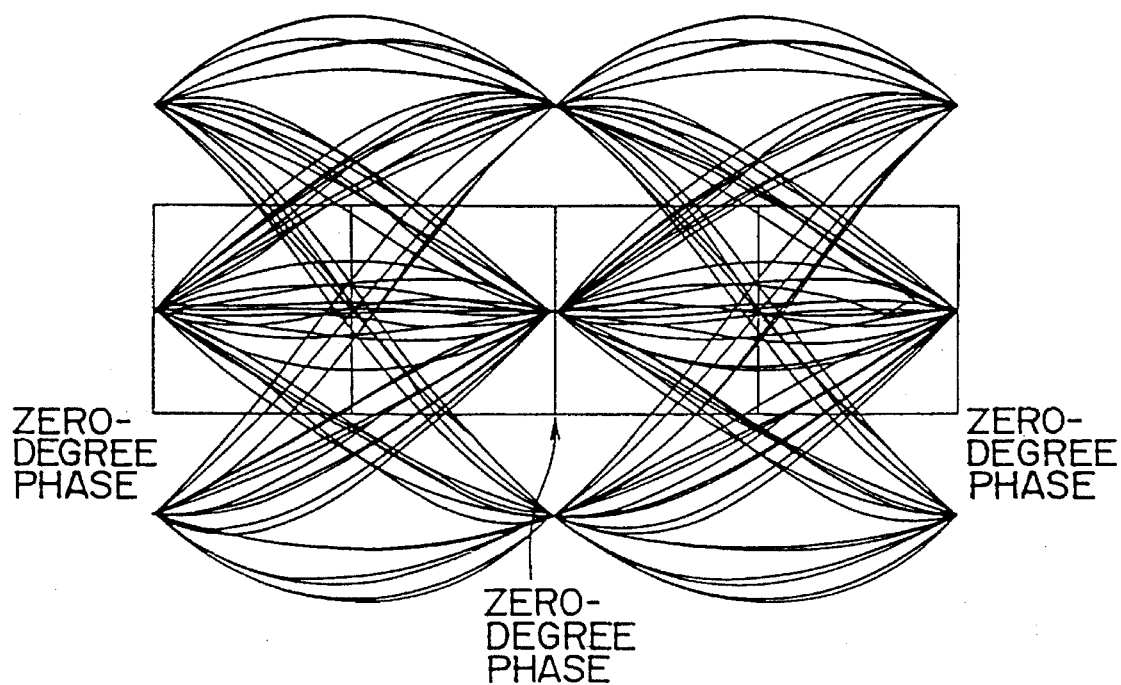
ZERO-DEGREE PHASE                    ZERO-DEGREE PHASE
ZERO-DEGREE PHASE

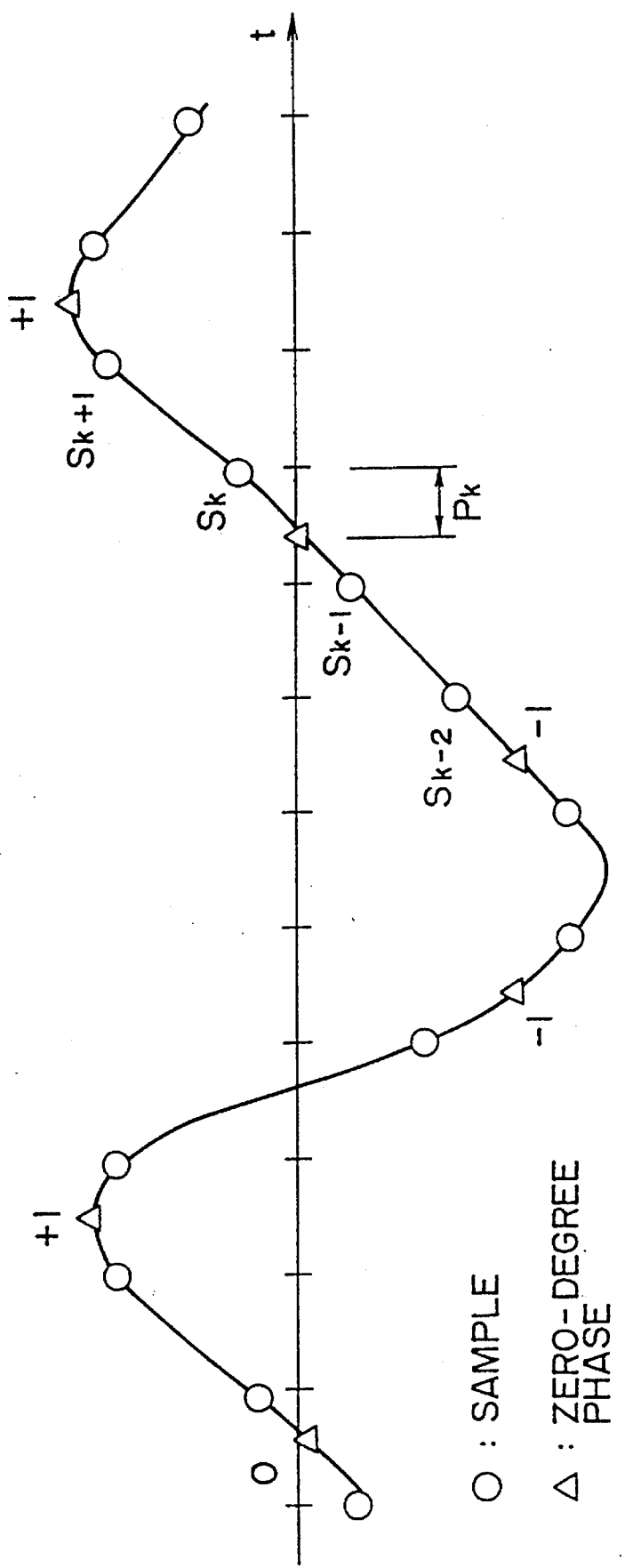

DATA DETECTING APPARATUS USING AN OVER SAMPLING AND AN INTERPOLATION MEANS

This is a continuation of application Ser. No. 08/016,968, filed Feb. 12,1993, now abandoned.

BACKGROUND OF THE INVENTION

1. Field of the Invention

The present invention relates to a data detecting apparatus and, more particularly, to a data detecting apparatus for detecting data of a reproduced signal coming from a channel used in digital magnetic recording apparatus or the like.

2. Description of the Prior Art

In Dolvio, F., "SIGNAL PROCESSING FOR HIGH DENSITY DIGITAL MAGNETIC RECORDING", CH2704-5/89/0000/1091/$01.00 c 1989, IEEE, 1-91 to 1-96, a data detecting apparatus was proposed, which detects reproduced signal data by observing a reproduced signal coming from a channel and decoding the signal by a Viterbi decoder. In the proposed constitution, it is necessary to give the Viterbi decoder two parameters; (1) a sample of a signal level value at a true data presence time (this is called "zero-degree phase") and (2) a mean value of zero-degree phase signal levels obtained by averaging noises contained in the reproduced signal.

It is therefore necessary for the data detecting apparatus to have both a phase-locked loop (hereinafter called a PLL) for making the apparatus be synchronized with zero-degree phase and a signal-level mean-value tracking circuit. Conventionally, these two functions have been implemented by controlling a sampling phase and a gain through a stochastic steepest descent algorithm.

With the above-mentioned conventional data detecting apparatus, however, jitters contained in an input reproduced signal causes a sampling phase to fluctuate, adversely affecting operations of the Viterbi decoder and digital circuits such as other decoders installed on subsequent stages. This disadvantage makes it difficult to design high-speed circuits in particular and perform tests on LSI circuits.

OBJECT AND SUMMARY OF THE INVENTION

It is therefore an object of the present invention to provide a data detecting apparatus which detects reproduced signal data without being affected by jitters contained in a reproduced signal coming from a channel.

In carrying out the invention and according to one aspect thereof, there is provided a data detecting apparatus which detects desired data from the reproduced digital signal coming from the channel, comprising first sampling means for outputting samples by sampling the digital signal, interpolating means (for example, an interpolating filter 11 used in an embodiment of the present invention) for interpolating signal values between the outputted samples, and second sampling means (for example, resampling section 12 in the embodiment of the present invention) for picking up such a signal value from the interpolated signal values as matching a phase of a data presence point of the digital signal.

BRIEF DESCRIPTION OF THE DRAWINGS

FIG. 1 is a block diagram illustrating a constitution of a data detecting apparatus practiced as an embodiment of the present invention.

FIGS. 2(a)–2(d) is a waveform diagram illustrating operations of the embodiment of FIG. 1.

FIGS. 8(a)–8(i) depicts output coefficients of ROMs shown in FIG. 7.

FIG. 14 is a waveform diagram illustrating, by way of example, eye patterns with each of zero-cross points of signal waveforms always corresponding to a zero-degree phase.

FIG. 15 is a waveform diagram illustrating, by way of example, eye patterns of a reproduced signal coming from a PRS (1, 0, −1) channel.

FIG. 16 depicts a relationship between an equalized output sample and zero-degree phase data in the waveform of the reproduced signal from the PRS (1, 0, −1) channel.

DESCRIPTION OF THE PREFERRED EMBODIMENT

FIG. 1 shows a constitution of a data detecting apparatus practiced as a preferred embodiment of the present invention. Before describing the embodiment, a digital magnetic disk recording/reproducing apparatus that can incorporate the present invention will be described below.

Figure 10:
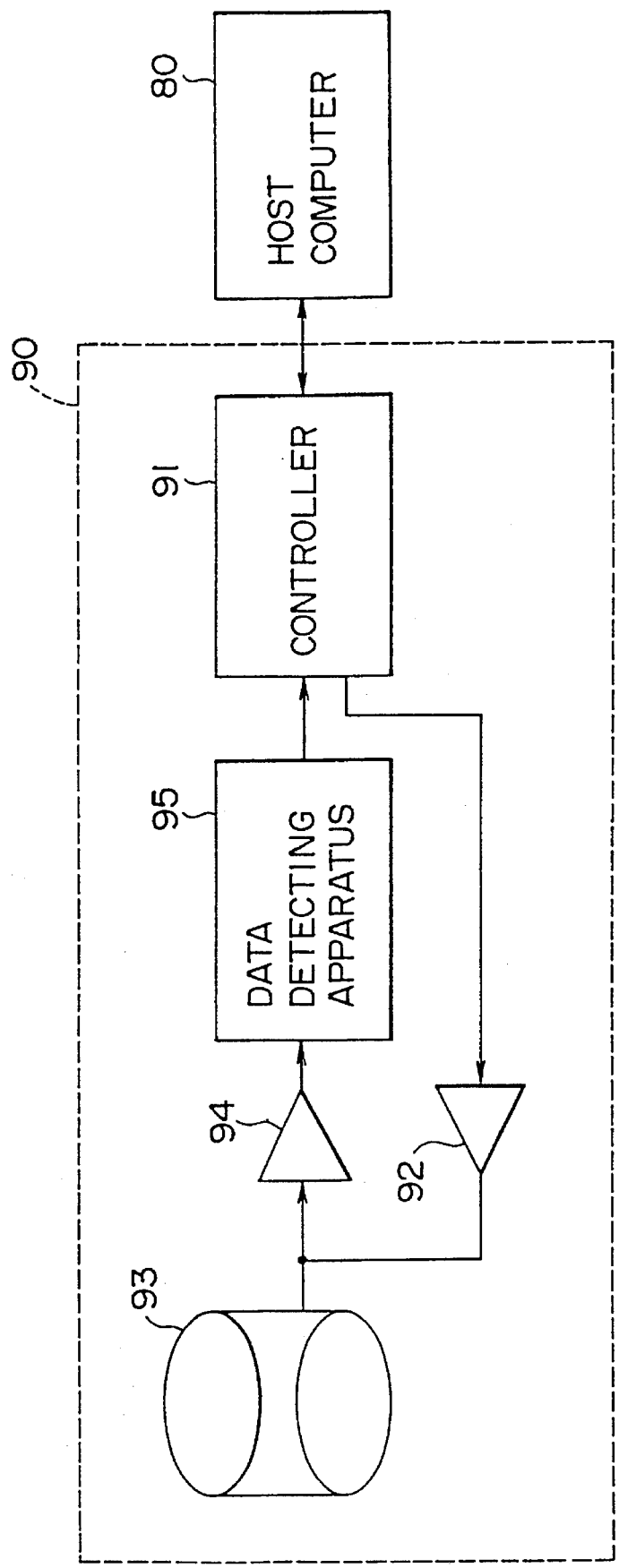
FIG. 10 is a block diagram illustrating an example of a digital magnetic disk recording/reproducing apparatus.

FIG. 10 is a block diagram of the digital magnetic disk recording/reproducing apparatus as viewed from flow of data. When recording data from a host computer 80 to a hard disk drive (HDD) subsystem 90, the data is first supplied from the host computer 80 through bus interface to a controller 91 in the HDD subsystem 90. The controller 91 formats the data so that it can be recorded on a magnetic disk and modulates the formatted data so that it can be adapted to a magnetic recording/reproducing channel before sending the resultant data to a recording amplifier 92. Upon reception of the data, the recording amplifier 92 flows a recording current in a magnetic head of a head disk assembly 93 to record the data. It should be noted that the head disk assembly 93 is a mechanical block comprising a data recording magnetic disk, a recording/reproducing head, a head positioning mechanism, and a spindle motor.

When reproducing data, a recorded magnetized pattern on the magnetic disk is read by the magnetic reproducing head in the head disk assembly 93. The read pattern is amplified by a reproducing amplifier 94 as an equivalent reproduced signal to be converted by a data detecting apparatus 95 into equivalent digital data. This digital data is further channel-demodulated and taken out of the format by the controller 91 to be sent over the bus interface to the host computer 80.

The present invention is available for the data detecting apparatus 95 in the magnetic recording/reproducing apparatus shown in FIG. 10.

Figure 11:
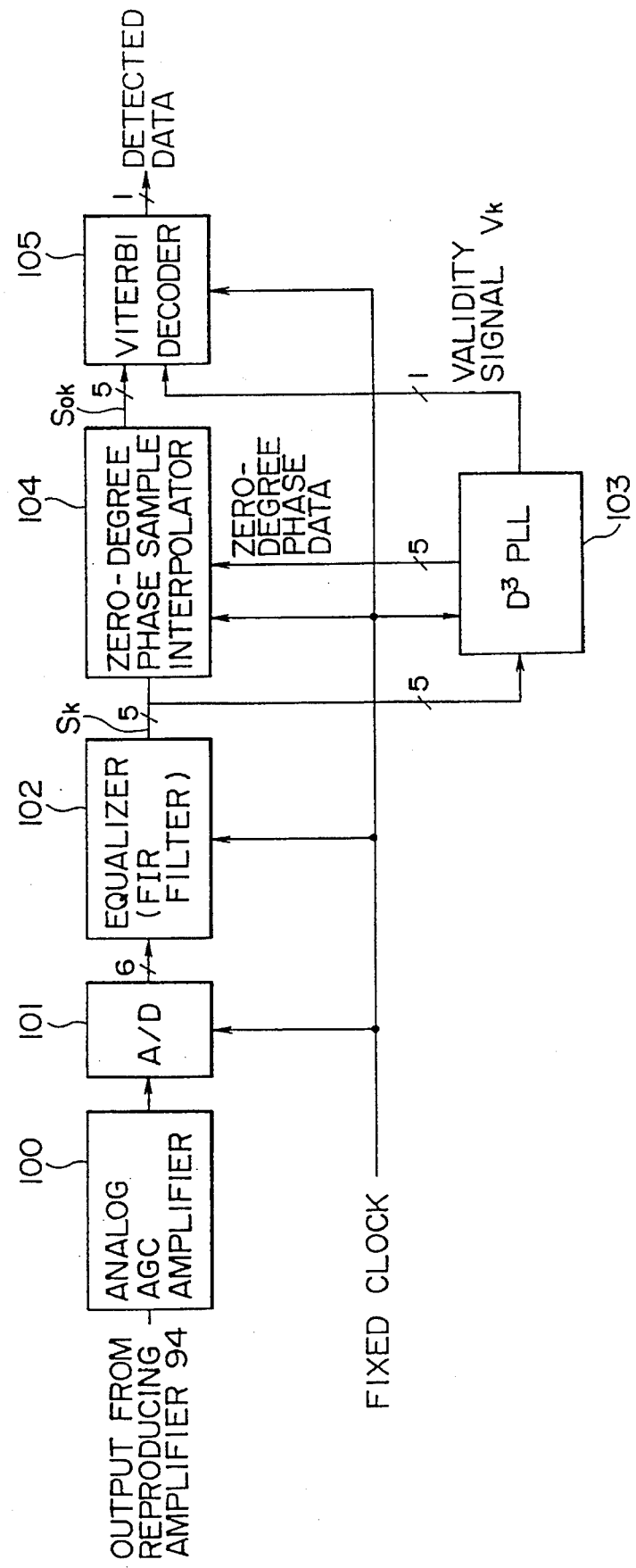
FIG. 11 is a block diagram illustrating, by way of example, a constitution of a data detecting apparatus 95 of FIG. 10.

The data detecting apparatus 95 for which the present invention is available comprises, as shown in FIG. 11, an analog AGC amplifier 100 which receives an output from the reproducing amplifier 94 and outputs a signal having a constant envelop level, an analog-to-digital (A-D) converter 101 which converts the output signal from the amplifier 100 into an equivalent digital signal, a transversal equalizer (FIR filter) 102 which equalizes the output signal from the A-D converter 101, a digital PLL circuit 103 which extracts a zero-degree phase clock from output $S_k$ received from the equalizer 102 to output zero- degree phase data, or a phase $P_k$ at a data presence point, a zero-degree phase sample-value interpolating circuit 104 which receives the outputs from the equalizer 102 and the digital PLL circuit 103 to output a signal amplitude level $S_{Ok}$ at the data presence point (zero-degree phase), and a Viterbi decoder 105 which performs a maximum likelihood operation based on the signal amplitude level $S_{Ok}$ to make data determination and output detected data $D_k$.

Because the output $S_{Ok}$ from the interpolating circuit 104 is outputted once in a sampling interval Ts, the output hits the zero-degree phase in only one out of two samples on the average. A validity signal $V_k$ is fed from the digital PLL circuit 103 to the Viterbi decoder 105 to indicate whether the output $S_{Ok}$ of the interpolating circuit 104 is at a zero-degree phase amplitude level to be subjected to data determination. The Viterbi decoder 105 may perform data determination only in the timing where $V_k=1$.

In the data detecting apparatus 95, all circuits subsequent to the A-D converter 101 perform digital signal processing. Generally, the data detecting apparatus 95 detects data at a speed of 10 megabits per second or higher. Therefore, to reduce the circuit scale, it is a general practice to represent the signal data of each section of the apparatus in a fixed-point form. And it is also necessary to limit a signal word length as short as possible. However, when the signal word length is made short, a signal dynamic range that can be expressed in each section of the apparatus is made narrow, causing an overflow when a large fluctuation occurs in the level of the reproduced signal. The analog AGC amplifier 100 is installed to maintain the reproduced signal level at almost the same level, thereby preventing the overflow in the data detecting apparatus 95 from happening.

The A-D converter 101 samples an analog reproduced signal coming from the AGC amplifier 100 at a sampling frequency fs, which is a constant multiple of a channel bit rate to quantize the signal into a predetermined signal word length. The present embodiment shows a simplest case in which the sampling frequency fs is double the channel bit rate.

The equalizer 102 eliminates an inter-code interference caused by band limit characteristic of the magnetic recording channel. This circuit is implemented by a digital signal processing unit by employing a transversal linear equalizer by way of example.

The digital PLL circuit 103 makes synchronization with the phase $P_k$ of data presence point based on the signal sample value $S_k$ sampled by a fixed clock. The digital PLL circuit is disclosed in U.S. Ser. No. 07/963,905 (filed Oct. 20, 1992) in detail, so that only its schematic configuration is shown in FIG. 12 with a simple description below.

Figure 12:
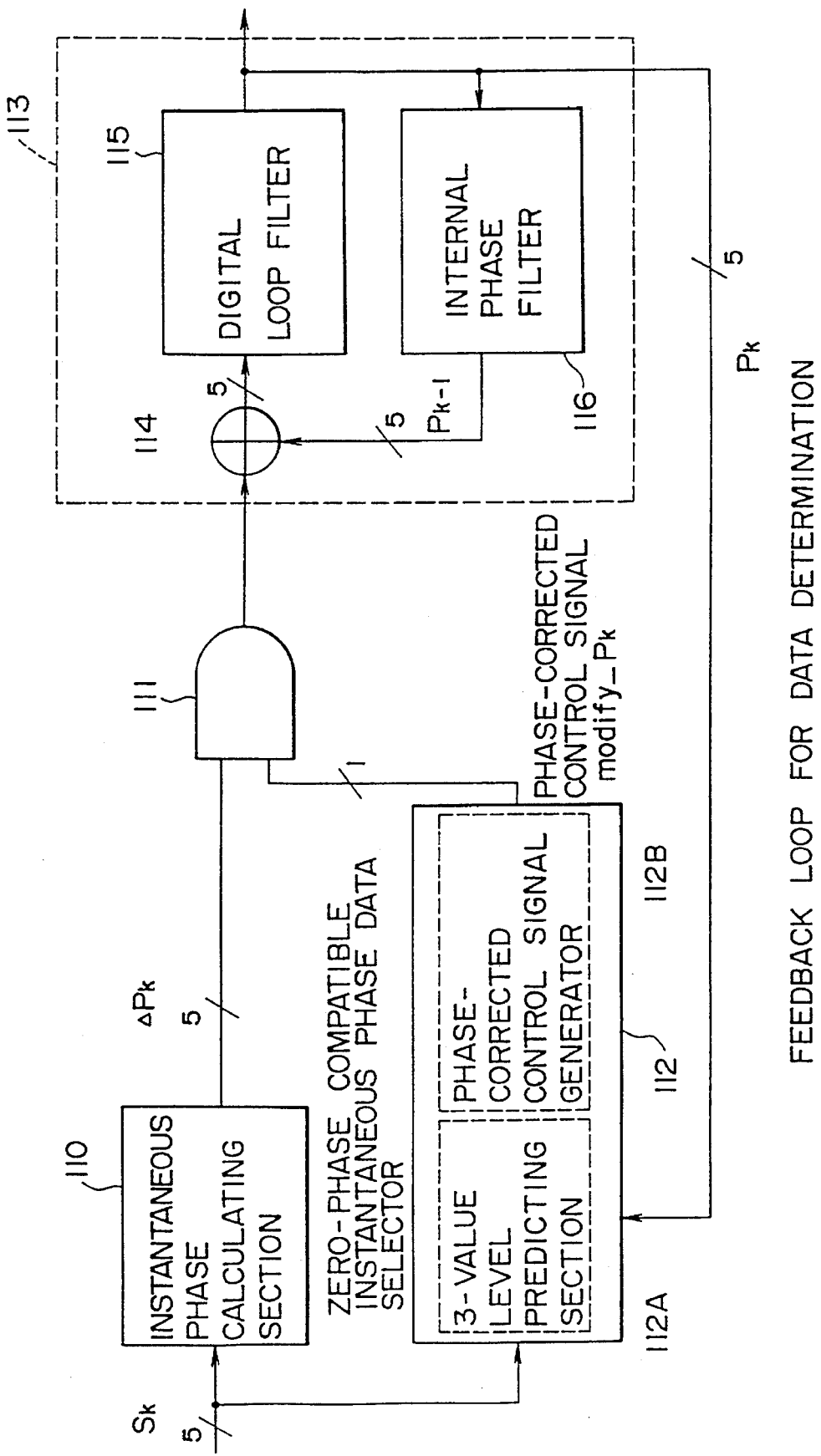
FIG. 12 is a block diagram illustrating, by way of example, a constitution of the digital phase-locked loop circuit 103 of FIG. 11.

Referring to FIG. 12, the digital PLL circuit 103 will be described starting with a description of an instantaneous phase calculating section 110. This section receives, as its input, the sample value $S_k$ of the PRS channel reproduced signal at time $t=k_s$. Based on two consecutive signal sample values sampled at the fixed clock asynchronously with the input signal data, the instantaneous phase calculating section 110 outputs an instantaneous phase $\Delta P_k$ which is a time from a signal sample $S_k$ presence time $t=kT_s$ up to a signal waveform zero-cross point (a candidate for the zero-degree phase) in a corresponding kth time slot. This instantaneous phase is outputted in units of number of quantized phases.

The instantaneous phase $\Delta P_k$ is a distance between the zero-degree phase having phase value 0 and the time $kT_s$, while indicating a value that the time $t=kT_s$ has in the phase. In the phase, 360 degrees correspond to a digital value $2^{NPLL}$ (where NPLL being a phase data word length). Time Ts having a one-time-slot width corresponds to 180 degrees in the phase; when the number of quantized phases is used as the unit, time $T_s$ corresponds to $2^{NPLL-1}$.

The instantaneous phase $\Delta P_k$ is obtained from Equation (1) below by supposing that a signal waveform between the two consecutive signal sample values $S_k$ and $S_k-1$ can be linearly approximated (refer to FIG. 13).

$$\Delta P_k = 2^{NPLL-1} \times \frac{S_k}{S_k - S_{k-1}} \quad (1)$$

where, $2^{NPLL-1}$ is the number of quantized phases for every other samples. It should be noted that, when $S_k-1=S_k$, a zero-denominator problem occurs; but the $\Delta P_k$ need not be calculated because actually no zero cross exists and therefore a PLL phase update is not performed.

Figure 13:
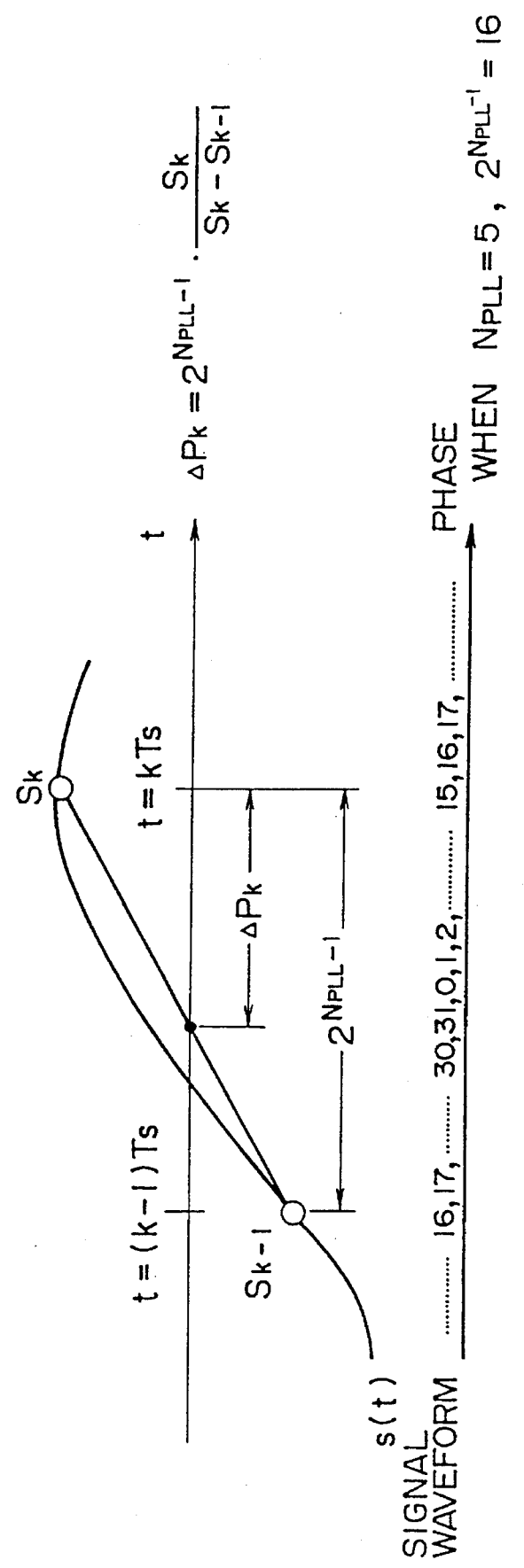
FIG. 13 depicts the operational principle of instantaneous phase data detection from PRS (1, 0, −1) reproduced-signal waveform in the digital phase-locked loop circuit 103 of FIG. 11.

The instantaneous phase $\Delta P_k$ is inputted in a digital signal processing type PLL 113 through an AND gate 111 as phase data $\Delta P_k$ of NPLL bits (5 in the example of FIG. 13).

Next, an instantaneous phase data selector 112 for zero-degree phase will be described. When a signal waveform crosses a zero point, the instantaneous phase $\Delta P_k$ is always calculated. Therefore, depending on a channel coding employed, the instantaneous phase may be calculated at a point which is not at the zero-degree phase at which original data is present. For example, in the case of a channel coding presenting eye patterns as shown in FIG. 14, each zero-cross point corresponds to each zero-degree phase. However, in the case of a partial response (hereinafter called PRS) (1, 0, 1) presenting eye patterns as shown in FIG. 15, a signal waveform may zero-cross even in a reverse phase other than a zero-degree phase. Therefore, it is necessary to select only an instantaneous phase calculated output at a true zero-degree phase by some means. To do so, in the case of PRS (1, 0, 1) for example, a 3-value level predicting section 112A is provided to detect a dummy data, and a phase control signal generating section 112B is provided to output a phase control signal modify_$P_k$ for the instantaneous phase $\Delta P_k$ determined to be the zero-degree phase based on the detected dummy data. This constitution makes it possible to supply only the selected instantaneous phase $\Delta P_k$ to the digital signal processing type PLL circuit 113 through the AND gate 111.

The digital signal processing type PLL circuit 113 operates in the following manner. This PLL circuit is a primary phase-locked loop implemented by digital signal processing to update the internal phase data $P_k$ in order to follow the input instantaneous zero-degree phase. The digital signal processing type PLL circuit 113 comprises a digital loop filter 115, an internal phase register 116 that delays the phase data $P_k$ outputted from the digital loop filter 115 for one sampling period to output an internal phase data $P_k-1$, and an adder 114 that adds the internal phase data $P_k-1$ to the instantaneous zero-degree phase supplied from the AND gate 111. A phase updating rule is as given by Equation (2).

$$\text{if(modify\_}P_k = 0) \quad (2)$$

then phase is not corrected (*PLL* runs on its own)

$$P_k = P_{k-1} + 2^{\text{NPLL}-1}$$

elseif(modify\_$P_k = 1$)

then phase is corrected $$P_k = P_{k-1} + 2^{\text{NPLL}-1} + d(\Delta P_k - (P_{k-1} + 2^{\text{NPLL}-1}))$$

As shown in FIG. 13, the kth time slot $((k-1) T_s < t - kT_s)$ is virtually divided into $2^{NPLL-1}$ quantized phases. As time passes, each quantized phase value is incremented in modulo ($2^{NPLL}$). The output phase $P_k$ of the digital PLL circuit 103 is a phase at sampling time $t=kT_s$ (a terminal time of the kth time slot) and its phase value at zero- degree phase time is 0. Therefore, $P_k$ represents a time between fixed sampling time $t=kT_s$ and a zero-degree phase point (a distance in units of the number of quantized phase). It should be noted that a sampling rate is double a channel rate, so that zero-degree phase data is present only in every two time slots on the average. Consequently, a validity signal $V_k$ which indicates whether the zero-degree phase data is present is generated by a digital PLL circuit 83 according to Equation (3) below.

$$\text{if}(P_{K-1} > P_K) \quad (3)$$

then Valid (zero-degree phase exists in slot)

$$V_k = 1$$

elseif($P_{k-1} \leq P_k$)

then Invalid (zero-degree phase does not exist in slot)

$$V_k = 0$$

The zero-degree phase data $P_k$ and the validity signal $V_k$ are supplied to the zero-degree phase sample value interpolating circuit 104 as data which indicates a position in the time slot of the zero-degree phase data presence point.

Operational principles and constitution of the embodiment of the data detecting apparatus according to the present invention, or the zero-degree phase sample value interpolating circuit 104 will be described as follows.

With the data detecting apparatus according to the present invention, all processing operations including equalizing and phase locking are performed based on samples which are asynchronous with reproduced data. Consequently, a zero-degree phase signal value necessary for data determination is calculated from a sample series by interpolation after equalization. An interpolator for this purpose is implemented by an over-sampling interpolating filter.

First, equalizer output samples are over-sampled at a speed $2^{NPLL-1}$ times as high as the original sampling rate, filled with zeros. Filtering the resultant over-sample series by interpolation with a linear phase FIR-LPF (low- pass filter) having a cutoff frequency of fs/2 allows to calculate a signal level at each of quantized phases. Because one of these quantized phases is a zero-degree phase, only the interpolated signal sample at the zero- degree phase is resampled to be supplied to a data determination circuit such as the Viterbi decoder 105.

Actually, it is unnecessary to perform an interpolation filtering operation on all quantized phases. It may be performed on only those zero-degree phases which are necessary for data determination.

Substantial feature of the present invention is that all processing operations including equalization and phase locking are performed on a fixed clock which is asynchronous with reproduced data containing jitters. Therefore, in most cases, an equalized output sample does not match a zero-degree phase sample which is meaningful as true reproduced data. However, the equalized signal sample at a zero-degree phase is necessary for data determination such as Viterbi decoding at a final stage.

The relationship between the sample and the zero-degree phase is as shown in FIG. 16. It is necessary to obtain by some computational means a signal sample value at a zero-degree phase based on a plurality of samples before and after a corresponding time slot and a zero-degree phase indicating value $P_k$.

For zero-degree phase sample value interpolating techniques, Newton's interpolation formula or the like is available. However, it is said that, when a degree of an equation is small, a resultant interpolation accuracy becomes low.

To overcome this problem, a method for applying the over-sampling filter has been invented by getting a hint from a sampling rate converter used in digital audio equipment or the like. Required here is not sampling rate conversion but, so to speak, sampling phase conversion. Since integration of frequency variations is a phase variation, sampling rate conversion and sampling phase conversion are a same event described from different viewpoints. Consequently, the same principle can be applied to both conversion schemes. It should also be noted that digital magnetic recording/reproduced signals can be supposed to be substantially limited in band, so that the present invention based on a digital signal processing theory is suitable for zero-degree phase interpolation.

FIG. 1 shows a constitution of the embodiment of the data detecting apparatus according to the present invention. FIG. 2 illustrates operations of the embodiment of FIG. 1 by way of example. FIG. 3 illustrates power spectral densities of signals generated from sections constituting the embodiment of FIG. 1.

An over-sampling section 10 over-samples input signal samples by filling zeros at a speed of $2^{NPLL-1}$ times as high as the original sample rate fs. This results in a waveform shown in FIG. 2(*b*). Samples at other than true input sample presence points are zeros, which are substantially the same as the input sample series. This spectrum repeats on the frequency axis at period fs as shown in FIG. 3(*a*).

An interpolating filter 11 is an FIR-LPF which operates on a clock of $2^{NPLL-1}$·fs to perform interpolation filtering on an output from the over-sampling section 10. When the interpolation filtering is performed, a sample value at a zero-filled point is calculated for interpolation. Along the time axis, an impulse response shown in FIG. 2(*c*) is convoluted in an non-zero sample in the over-sampled series to provide an interpolated sample series shown in FIG. 2(d) (in FIG. 2(d), the discrete sample series is continuously represented for ease of understanding).

The interpolated output series shown in FIG. 2(d) is delayed relative to the input series shown in FIG. 2(a) by a group delay in the interpolating filter 11. The delay of the interpolated output series is ½ of an impulse response length.

Figure 3A:
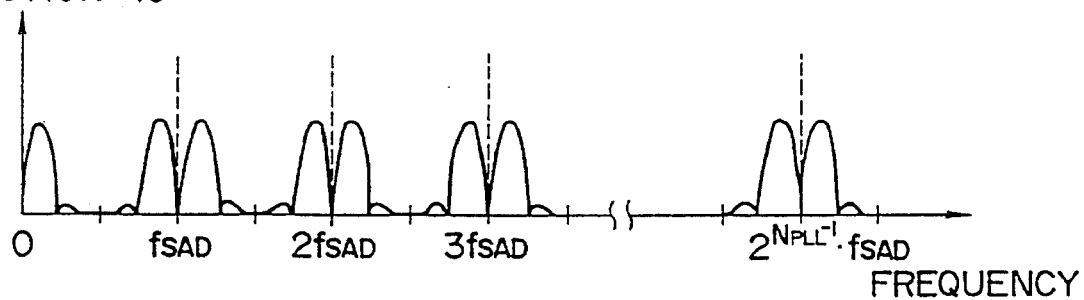
FIGS. 3(a)–3(d) illustrates an example of power spectral densities of signals generated from sections constituting the embodiment of FIG. 1.
Figure 3B:
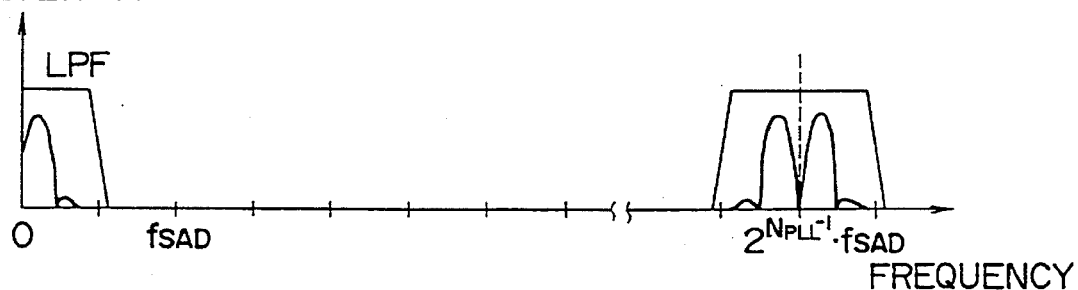

As shown in FIG. 3(b), the interpolating filter 11 operates in such a manner as to cut off the input signal spectrum repeating at frequency fs by an LPF having a cutoff frequency f/2. Thus, sample points between input sample series are interpolated to produce a series whose sampling frequency has been apparently increased $2^{NPLL-1}$ times.

Next, a resampling section 12 will be described. Some of samples in the interpolated series are zero-degree phase samples. Occurrence is one for every 2Ts seconds (where 1 Ts=1/fs) on the average; that is, one out of $2^{NPLL}$ interpolated samples on the average. Which one is a zero-degree phase sample is indicated by the phase $P_k$ outputted by the digital PLL circuit ($D^3PLL$) 103 for each time slot Ts. Therefore, resampling the interpolated sample at the phase $P_k$ provides a zero-degree phase sample necessary for processing by the Viterbi decoder 105 (it should be noted that $P_k$ is a phase obtained by quantizing a true zero-degree phase as an analog quantity into $2^{NPLL-1}$ phases per Ts; therefore, precisely, what is obtained by the interpolation is a quantized phase sample that is nearest the true zero-degree phase data amplitude value). The output from the resampling section 12 is supplied to a D input of a type-D flip-flop 13.

Figure 3C:
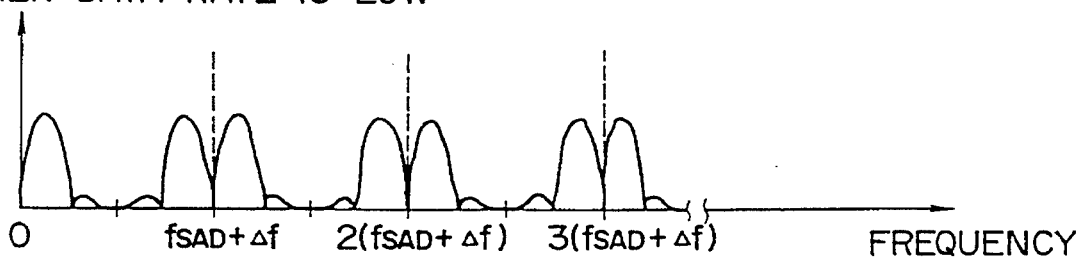
Figure 3D:

The resampling changes the spectrum pattern along the frequency axis. The resampling frequency gets shorter or longer than the fixed clock Ts depending on the variation of the channel bit rate of the reproduced signal caused by jitters. If the resampling frequency slightly increases to fs+Δf, then the spectrum pattern is elongated as shown in FIG. 3(c). Conversely, if the resampling frequency slightly decreases, then the spectrum pattern is compressed as shown in FIG. 3(d).

Simplification of an interpolating calculation considering the resampling will be described below. So far, the interpolation scheme has been described strictly according to the principles of interpolation. Actually, however, the interpolating filter 11 performs a convoluting calculation on sample series mostly consisting of zeros. Therefore, omitting the calculation for those series whose values are zeros can significantly decrease necessary computational quantity.

Figure 4:
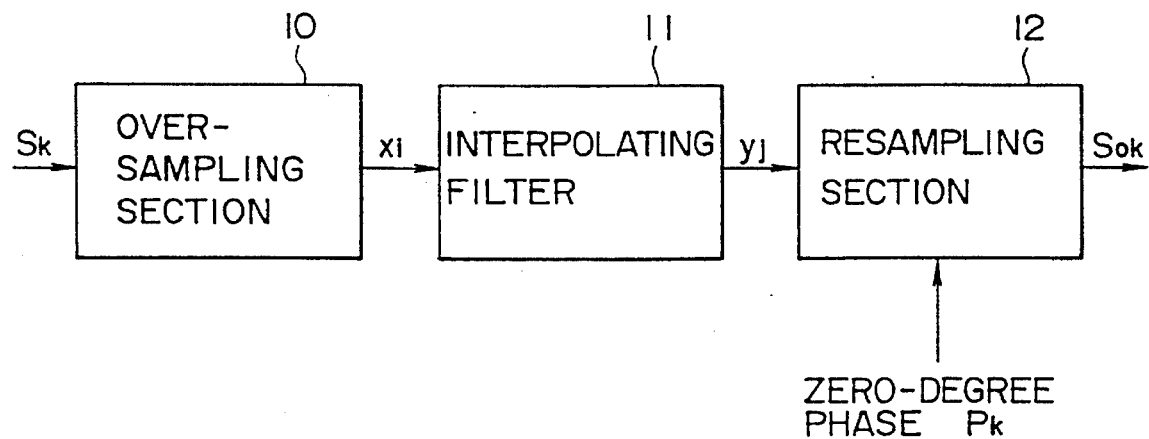
FIG. 4 depicts a definition of signal symbols to be provided when interpolating calculations are simplified with the embodiment of FIG. 1.
Figure 5:
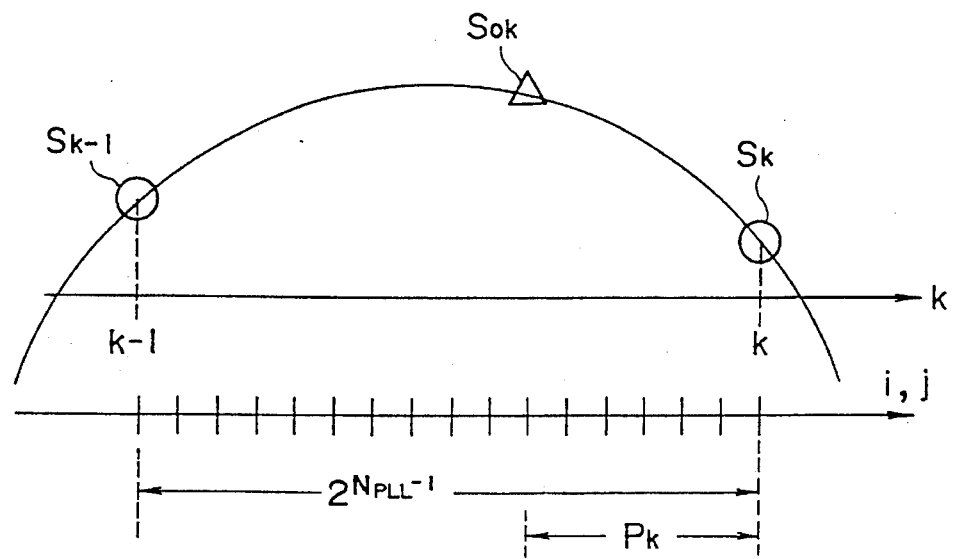
FIG. 5 depicts a timing relationship between the signal symbols defined in FIG. 4.

Now refer to FIG. 4, a block diagram representing the principle of interpolation. The relationship between time indices i, j, and k is illustrated in FIG. 5. k corresponds to a sampling clock (that is, a master clock for the entire data detecting apparatus 95) of the A-D converter 101. i and j are times corresponding to the quantized phases virtually set in one time slot by the digital PLL circuit 103.

First, relationships between signal samples in each interpolating step are represented in the following equations.

Step 1: zero-filled over-sampling

A non-zero sample is outputted only at a time when an input sample is present; at other times, a sample is filled with zeros, therefore, $$x_i = S_k \text{ if } i = 2^{NPLL-1} \cdot k \quad (4)$$

$$x_i = 0 \text{ if } i \neq 2^{NPLL-1} \cdot k \quad (5)$$

Step 2: Interpolation filtering

Impulse response hi of the interpolating filter 11 is convoluted in a zero-filled, over-sampled sample series xi. If the degree of the interpolating filter 11 is even number N, then $$y_i = \sum_{i=-N/2}^{N/2-1} h_i x_{j-i} \quad (6)$$

$$= H^T X$$

where, H is a Nth impulse response vector and X is an over-sampled signal sample vector.

$$H^T = [h_{-N/2}, \ldots h_{-1}, h_0, h_1, \ldots h_{N/2-1}] \quad (7)$$

$$X^T = [x_{j+N/2}, \ldots x_{j+1}, x_j, x_{j-1}, \ldots x_{j-N/2+1}] \quad (8)$$

Step 3: Resampling $P_k$ is a distance (time difference or phase difference) from time k at which $S_k$ is present back to zero-degree phase sample $S_{Ok}$ in one time slot. This is an output phase of the digital PLL circuit ($D^3PLL$) 103. The resampling section 12 selects the zero-degree phase sample $S_{Ok}$ out of the interpolating filter output series according to the value of $P_k$ and outputs the selected sample.

$$S_{ok} = y_i \text{ where } j = 2^{NPLL-1} \cdot k - P_k \quad (9)$$

Simplification of the interpolating calculation: Actually, when zero-filled sample xi=0, the coefficient multiplication and cumulation in Equation (7) become unnecessary, significantly simplifying the calculation. From Equations (6) and (9), a resampled zero-degree phase sample is expressed by Equation (10) as follows:

$$S_{ok} = y_i = \sum_{i=-N/2}^{N/2-1} h_i \times x_{(2^{NPLL-1} \times k - P_k - i)} \quad (10)$$

where, from Equation (5), $x(2^{NPLL}-1-P_k-i)$ is 0 except when $2^{NPLL}-1-P_k-i$ is an integral multiple of $2^{NPLL-1}$. That is, for an integer n, the following relation applies:

$$2^{NPLL-1} \cdot n = 2^{NPLL-1} \cdot k - P_k - i \quad (11)$$

Therefore, a multiplication of coefficient hi may be performed only when i satisfies the following condition:

$$i = 2^{NPLL-1} \cdot (k-n) - P_k \quad (12)$$

At this point of time, an over-sampled signal sample x is equal to an input sample Sn.

$$X(2^{NPLL-} \cdot k - P - i) = X_{(2^{NPLL-} \cdot n)} = Sn \quad (13)$$

Thus, the three interpolating steps mentioned above may be put together into a following single step:

$$S_{ok} = \sum_n h_{(2^{NPLL-1} \times (k-n) - P_k)} \times S_n \quad (14)$$

where $$-N/2 \leq 2^{NPLL-1} \cdot (k-n) - P_k \leq N/2 - 1$$

Taking only the time slot concerned (k=0), the calculation necessary for obtaining the interpolation output becomes as follows:

$$S_{OO} = \sum_n h_{(-2^{NPLL-1} \times n - P_0)} \times S_n \quad (15)$$

-continued where $$-N/2 \leq -2^{NPLL-1} \cdot n - P_0 \leq N/2 - 1$$

Figure 6:
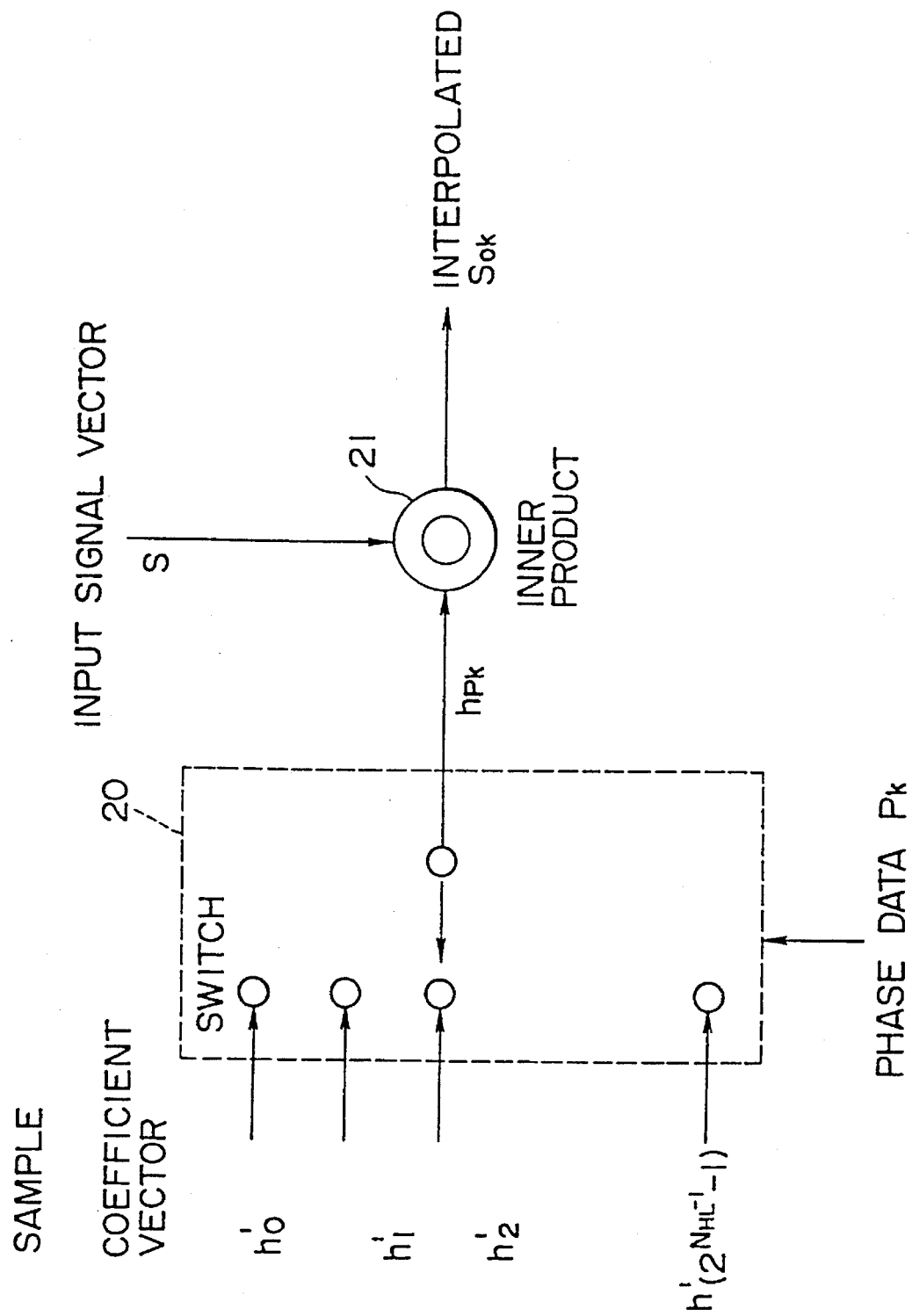
FIG. 6 is a block diagram of a real-time variable coefficient finite impulse response (FIR) filter.

Therefore, the interpolating calculation may be performed only by convoluting in the input signal sample a value obtained by thinning out a Nth FIR filter coefficient vector h in every $2^{NPLL-1}$. A phase for thinning out the vector h is indicated by $P_k$. That is, the interpolating circuit may be simplified into an $N/(2^{NPLL-1})$th real-time variable coefficient FIR filter which includes a switch 20 for selecting the coefficient vector h based on the phase data $P_k$ and an inner product calculating means 21 for obtaining an inner product between the coefficient vector h and an input signal vector S as shown in FIG. 6.

Hardware constitution for simplified calculation:

The interpolating hardware for executing equation 15 may only be an FIR filter with which the coefficient vector h can be replaced on a real-time basis. A set of coefficient vector h is offered upon completion of design of the interpolating filter 11 without having to be modified later. Therefore, each tap coefficient may only be stored in each of ROM tables whose addresses may be later switched by $P_k$ all at once.

Figure 7:
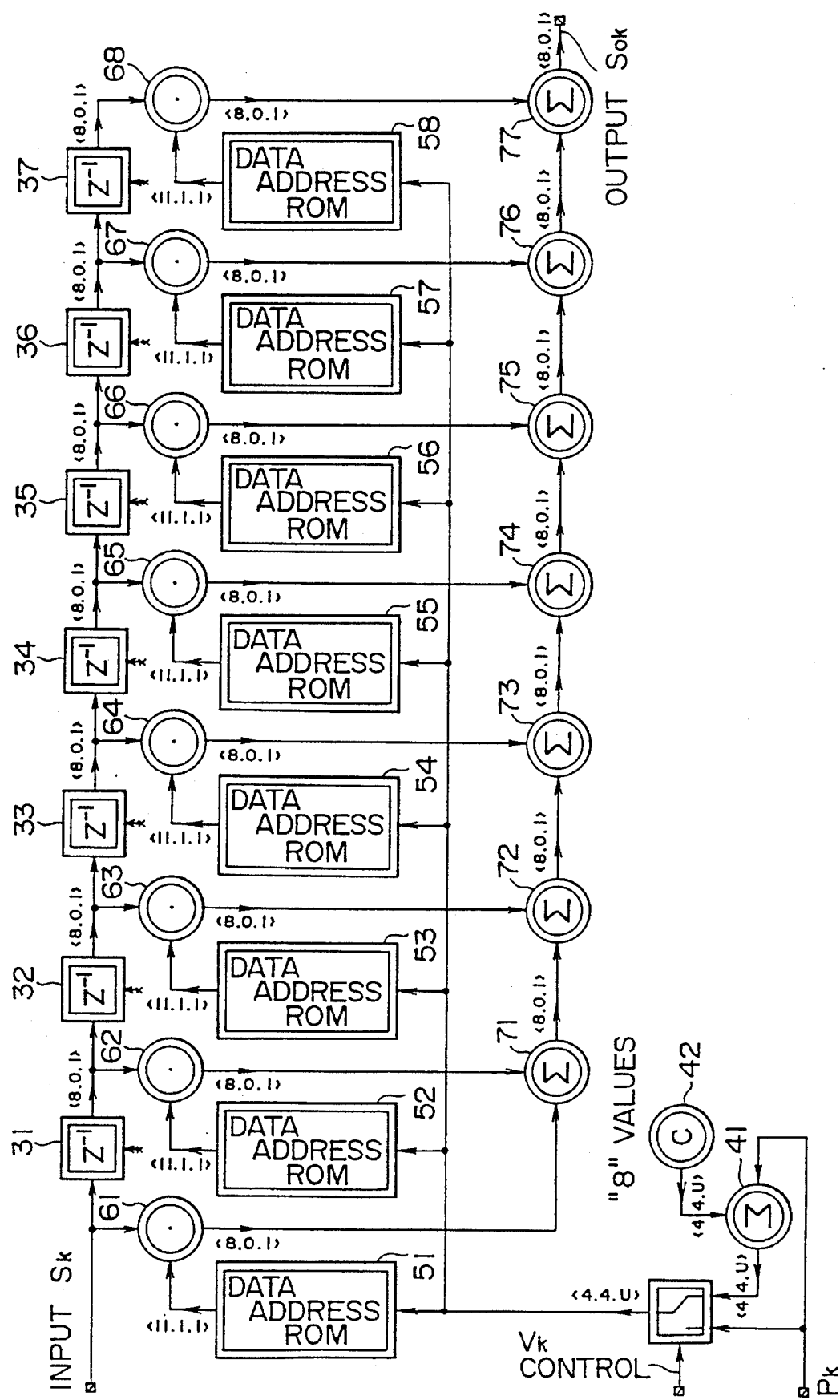
FIG. 7 is a block diagram of an example of a hardware constitution for executing simplified interpolating calculation of Equation (15).

FIG. 7 shows, by way of example, a hardware constitution for carrying out the simplified interpolating calculation expressed in Equation (15). Necessary parameters are set as follows:

N=128, NPLL=5, and $2^{NPLL-1}$=16.

Each tap coefficient of the FIR filter is given by the ROM table storing $2^{NPLL-1}$ kinds of coefficients. Data, or output coefficients to be stored in each ROM are shown in FIG. 8. The data to be stored in each ROM is obtained by cutting the impulse response of the theoretical Nth FIR filter by a length of $2^{NPLL-1}$=16. The ROM addresses are switched all at once depending on the phase data $P_k$ given from the digital PLL circuit ($D^3$PLL) 103 to perform interpolation and resampling at the same time. It should be noted that the $P_k$ may vary in each time slot, so that the coefficient ROM addresses must be able to be switched inside each time slot.

The zero-degree phase at which data is present exists only in every two time slots on the average. In the case of time slot having no zero-degree phase, $P_k$ represents a distance (the number of quantized phases) between corresponding time k and zero-degree phase $S°_{k-1}$ in an adjacent slot. Its value is $P_{k-1} + 2^{NPLL-1}$. The digital PLL circuit ($D^3$PLL) 103 outputs a validity signal $V_k$ to indicate whether a zero-degree phase exists in a slot. An interpolation output can be obtained even from a slot having no zero-degree phase because the interpolating filter operates on such invalid slot. To obtain the interpolation output, the following classification must be performed to calculate a correct address $A_k$:

if $V_k = 1$(valid)                                                     (16)

then $A_k = P_k$ elseif $V_k = 0$(invalid)

then $A_k = P_k + 2^{NPLL-1}$

In the block diagram shown in FIG. 7, a constant circuit 42 generates $2^{NPLL-1}$, an adder 41 adds the output $2^{PLL-1}$ of the constant circuit to $P_k$, and a switch 43 selectively outputs the output of the adder 41 and $P_k$ in order to carry out the calculation expressed in Equation (16). However, with an actual digital hardware implementation, this address calculation is obtained by simply ignoring the most significant bit (MSB) of $P_k$, requiring no special hardware.

Other sections of the block diagram shown in FIG. 7 will be described as follows. Each of seven delay circuits 31, 32, 33, 34, 35, 36 and 37 connected in series delays input $S_k$ by one time slot. Each of ROM's 51, 52, 53, 54, 55, 56, 57 and 58 outputs data corresponding to addresses supplied from the switch 43, or coefficients (for their details, see FIG. 8). A multiplier 61 multiplies the input $S_k$ by an output coefficient of the ROM 51. An multiplier 62 multiplies an output of the delay circuit 31 by an output coefficient of the ROM 52. A multiplier 63 multiplies an output of the delay circuit 32 by an output coefficient of the ROM 53. A multiplier 64 multiplies an output of the delay circuit 33 by an output coefficient of the ROM 54. A multiplier 65 multiplies an output of the delay circuit 34 by an output coefficient of the ROM 55. A multiplier 66 multiplies an output of the delay circuit 35 by an output coefficient of the ROM 56. A multiplier 67 multiplies an output of the delay circuit 36 by an output coefficient of the ROM 57. A multiplier 68 multiplies an output of the delay circuit 37 by an output coefficient of the ROM 58. An adder 71 adds an output of the multiplier 61 to an output of the multiplier 62. An adder 72 adds an output of the multiplier 63 to an output of the adder 71. An adder 73 adds an output of the multiplier 63 to an output of the adder 72. An Adder 74 adds an output of the multiplier 65 to an output of the adder 73. An adder 75 adds an output of the multiplier 66 to an output of the adder 74. An adder 76 adds an output of the multiplier 67 to an output of the adder 75. An adder 77 adds an output of the multiplier 68 to an output of the adder 76. As a result of these operations, $S_{Ok}$ is outputted from this hardware that carries out simplified interpolating calculations.

If an interpolating calculation is performed on an invalid slot, its result is not used for data determination. In this sense, about a half of the calculation performed by the interpolating circuit is redundant. This is because, due to the nature of the present invention, there is a case in which two adjacent time slots are valid. This redundancy is eliminated by an FIFO buffer provided in data determination circuits including the Viterbi decoder 105.

FIG. 9 shows interrelations between the embodiment of the present invention illustrated in FIG. 1 and the digital PLL circuit 103 illustrated in FIG. 11. FIG. 9(a) is an analog representation of an input signal to the digital PLL circuit 103 and the zero-degree phase sample value interpolating circuit 104. With this sinusoidal wave, the bit rate is lower than a center frequency (½ of the sampling rate of fixed frequency) of the PLL by about 4%. A sample $S_k$ obtained by sampling this sinusoidal signal by the fixed clock is shown in FIG. 9(b).

Figure 9A:
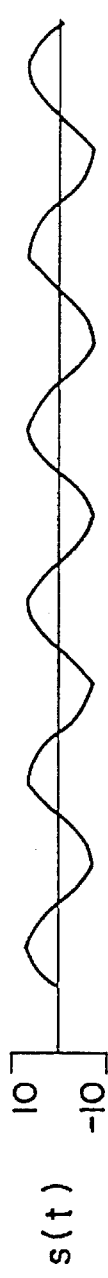
FIGS. 9(a)–9(f) are a waveform diagram illustrating, by way of example, interrelationships between the embodiment of FIG. 1 and a digital PLL circuit 103 of FIG. 11.
Figure 9B:
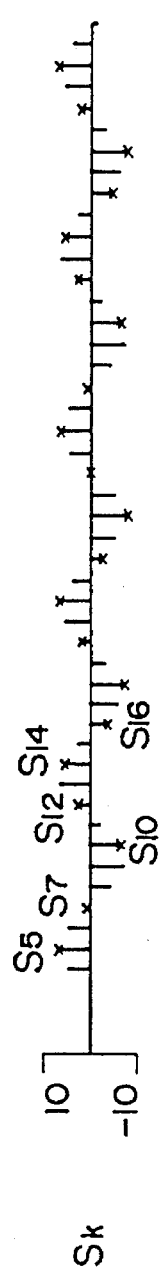
Figure 9C:
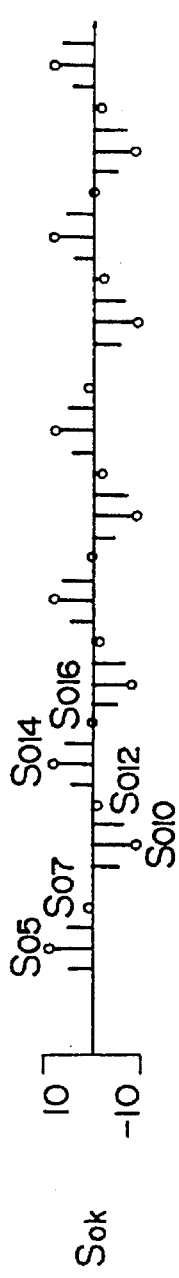
Figure 9D:
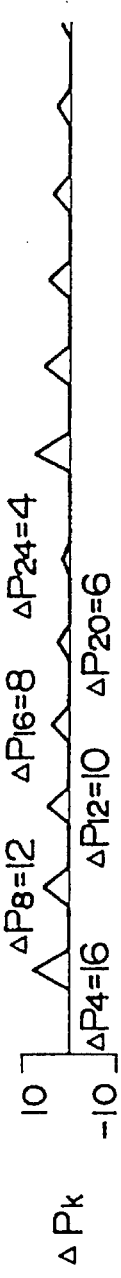

The digital PLL circuit 103 calculates an instantaneous phase $\Delta P_k$ from the $S_k$ shown in FIG. 9(b). Because the input signal frequency is low as shown in FIG. 9(d), the instantaneous phase $\Delta P_k$ gets smaller as time passes in modulo 16, changing to a sawtooth waveform. The digital PLL circuit 103 follows the instantaneous phase $\Delta P_k$ while modifying its internal phase to output the phase $P_k$. As shown in FIG. 9(f), the phase $P_k$ also changes to a sawtooth waveform, following a phase transition of the input signal.

Figure 9E:
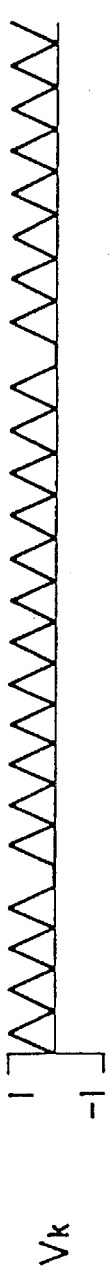
Figure 9F:
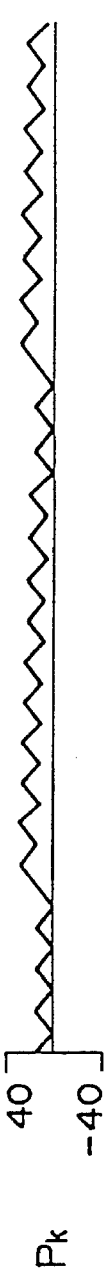

As shown in FIG. 9(e), the validity signal $V_k$ normally repeats "valid" and "invalid" in every other sample. This is because a zero-degree phase data point exists only once in every two time slots on the average. However, to cope with a slow change of the input signal, "invalid" is given twice consecutively in every 25 samples.

FIG. 9(c) shows the output $S_{Ok}$ of the zero-degree phase sample value interpolating circuit 104. In the figure, each valid sample is marked with a tiny circle. These output samples approximately correspond to one of −1, 0, and +1, indicating a match with the true zero-degree phase data. In other words, this indicates that, in spite of an offset between the input signal frequency and the PLL center frequency, phase locking and zero-degree phase data value interpolation are correctly performed by the present invention. On the contrary, in the case of the input sample $S_k$, valid samples do not always correspond to correct data values; for example, $S_{10}$, $S_{12}$, and $S_{14}$ do not match data values −1, 0, and +1 at all.

Although the above-mentioned embodiment uses a Viterbi decoder for data detection, a data detector based on a simple comparison with threshold values is also available.

Although the above-mentioned embodiment is related to PRS (1, 0, −1), the present invention is also applicable to PRS (1, −1).

In addition to a digital magnetic recording/reproducing apparatus, this invention is applicable to various other apparatus including a digital communications equipment.

As described and according to the data detecting apparatus as an embodiment of the present invention, an interpolating circuit interpolates signal values between samples outputted from a sampling circuit. An extracting means extracts those interpolated signal values which match the phase of a point at which reproduced signal data exists. This constitution allows to implement all blocks constituting the data detecting apparatus by digital signal processing circuits synchronously operating on the same clock, detecting the reproduced signal data without being affected by jitters contained in reproduced signals coming from a channel. Also, this constitution makes it possible to form on a single LSI chip such circuits including the data detecting apparatus, an ECC decoder, a controller, and an interface circuit as conventionally formed on discrete chips. This permits the compact implementation of an entire apparatus and reduces its production cost. Further, this constitution facilitates the design and test for implementing the embodiment on large scale integrations. In addition, this constitution eliminates the necessity for externally attached analog parts, making the implementation free of adjustment and less susceptible to aging.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data detecting apparatus for detecting data in a digital signal obtained via a channel, said digital signal having data generated at a rate of fs, comprising:

first sampling means for sampling said digital signal and for generating a succession of samples, said first sampling means comprising means for performing zero-filled over-sampling at a rate of $2^{NPLL-1} \cdot fs$, NPLL−1 being a number that is one less than a word length in bits of said samples;

interpolating means following said first sampling means for interpolating signal values between said samples generated by said first sampling means and thereby generating a plurality of interpolated signals each having a phase, said interpolating means comprising a finite impulse response filter that operates at said rate of $2^{NPLL-1} \cdot fs$;

phase-locked loop means for generating a signal identifying a selected phase; and second sampling means following said interpolating means for identifying and extracting interpolated signals from among said plurality of interpolated signals which are correlated to said selected phase.

2. A data detecting apparatus according to claim 1, further comprising detecting means for detecting data from said interpolated signal values extracted by said second sampling means.

3. A data detecting apparatus according to claim 2, wherein said data detecting means comprises a Viterbi decoding means for performing maximum likelihood decoding.

4. A data detecting apparatus according to claim 2, further comprising:

analog-to-digital converting means for generating said digital signal from an analog signal; and an equalizing means disposed between said analog-to-digital converter and said interpolating means for equalizing said digital signal generated by said analog-to-digital converting means;

wherein said analog-to-digital converting means, said equalizing means, said first sampling means, and said detecting means all operate in synchronization with a common clock having a fixed frequency.

5. A data detecting apparatus according to claim 1, wherein said phase-locked loop means comprises means for generating phase information from said digital signal for setting said selected phase as a zero-degree phase data presence point.

6. A data detecting apparatus as claimed in claim 1, wherein said interpolating means comprises:

a plurality of successive stages, including a fist stage supplied with said succession of samples, a second stage, a plurality of successive stages following said second stage, and a last stage, each stage including a read-only-memory in which coefficients are stored;

selector means connected to each read-only-memory for causing each read-only memory to emit one of the coefficients stored therein, dependent on said selected phase;

said first stage having multiplier means for multiplying an incoming sample in said succession of samples by the coefficient emitted by the read-only-memory in said first stage, to generate a product;

said second stage having delay means for delaying said incoming sample to produce a delayed sample, multiplier means for multiplying said delayed sample by the coefficient emitted by the read-only-memory in said second stage to generate a product, and adder means for generating a sum by adding the product generated in said second stage to the product generated by said first stage; and each of said successive stages having delay means for delaying the delayed sample from an immediately preceding stage to produce a new delayed sample, multiplier means for multiplying said new delayed sample by the coefficient emitted by the read-only-memory in that stage to generate a product, and adder means for generating a sum by adding the product generated in that stage to the sum generated in said immediately preceding stage, with the sum generated in said last stage comprising an interpolated signal.

* * * * *